(12) United States Patent
Geffner et al.

(10) Patent No.: US 7,996,476 B2
(45) Date of Patent: Aug. 9, 2011

(54) DO NOT DISTURB FILTER FOR ELECTRONIC MESSAGES

(75) Inventors: Steven Paul Geffner, Bothell, WA (US); Tao Huang, Redmond, WA (US); Sandhya D. Jain, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 148 days.

(21) Appl. No.: 12/261,034

(22) Filed: Oct. 30, 2008

(65) Prior Publication Data
US 2010/0115033 A1    May 6, 2010

(51) Int. Cl.
  *G06F 15/16* (2006.01)
(52) U.S. Cl. ......... 709/206; 709/224; 709/225; 370/429
(58) Field of Classification Search .......... 709/206, 709/224, 225; 370/429
See application file for complete search history.

(56) References Cited

U.S. PATENT DOCUMENTS

| | | | |
|---|---|---|---|
| 6,085,101 A | 7/2000 | Jain et al. | |
| 7,451,218 B2 * | 11/2008 | Malik et al. | 709/225 |
| 2002/0087641 A1 | 7/2002 | Levosky | |
| 2004/0221204 A1 * | 11/2004 | Johnson | 714/47 |
| 2007/0078905 A1 | 4/2007 | Gunther et al. | |
| 2007/0223662 A1 | 9/2007 | Jain et al. | |
| 2009/0228583 A1 * | 9/2009 | Pocklington et al. | 709/224 |

OTHER PUBLICATIONS

Lai, et al., "BlueSpace: Personalizing Workspace through Awareness and Adaptability", Int. J. Human-Computer Studies (2002) 57, pp. 415-428.
Venolia, et al., "Supporting Email Workflow", Sep. 2001, 8 pages.
"Take Control of Email Using Priority and Do Not Disturb (Outlook Productivity Series)," downloaded Sep. 1, 2008 from http://www.groovypost.com/howto/microsoft/outlook/take-control-of-email-using-a..., 7 pages.

* cited by examiner

*Primary Examiner* — Kyung-Hye Shin
(74) *Attorney, Agent, or Firm* — Hope Baldauff Hartman, LLC

(57) ABSTRACT

Data is received defining a time period during which a notification of receipt should not be provided when an electronic message is received. Data may also be received defining certain types of messages for which notification of receipt should be provided during the time period. During the duration of the time period, no notification of receipt is provided for received electronic messages that are not within one of the specified types. After the time period has elapsed, notification of receipt is provided for electronic messages received during the time period and for which no notification of receipt was previously provided. Electronic messages may be sent during the time period and electronic messages received prior to the time period may be displayed for reading during the time period.

20 Claims, 5 Drawing Sheets

DO NOT DISTURB FILTER FOR ELECTRONIC MESSAGES

BACKGROUND

Electronic messaging has become an integral part of the way people communicate with one another today. For instance, many people today utilize electronic mail ("e-mail"), instant messaging ("IM"), and short message service ("SMS") messages to communicate with friends, family, and business associates. In general, electronic messaging provides a quick, efficient, and generally inexpensive mechanism for communicating with others.

Although electronic messaging provides a large number of benefits, there are also several disadvantages to this form of communication. For instance, certain types of electronic messages can be used so pervasively that users may simply be overloaded with messages. As an example, e-mail is the preferred form of communication in some organizations. In these organizations it is not unusual for individuals to be continually distracted from their work by the seemingly never-ending delivery of e-mail messages to their e-mail inbox. The interruptions caused by the non-stop delivery of e-mail messages can significantly reduce an individual's productivity.

One way to eliminate the distractions caused by the continued delivery of e-mail is to exit the e-mail client application. Another way to eliminate the distractions is to minimize the graphical user interface ("GUI") window provided by the e-mail client application. These solutions are suboptimal, however, because they do not allow a user to continue to read previously received e-mail messages or to compose and send new e-mail messages. A user that utilizes these solutions is also prohibited from viewing all new incoming e-mail, even mail messages that are very important such as those that include updates to meeting requests. This can be extremely frustrating for a user that would like to view previously received e-mail or to compose and send new e-mail messages while still avoiding the interruptions caused by newly arriving e-mail messages.

It is with respect to these considerations and others that the disclosure made herein is presented.

SUMMARY

Concepts and technologies are described herein for providing a do not disturb ("DND") filter for electronic messages. In particular, through the use of the DND filter presented herein, the interruptions caused by the delivery of new electronic messages, such as e-mail messages, instant messages, and SMS messages, can be eliminated while still allowing a user to read previously received messages and to compose and send new messages. Additionally, the DND filter can be configured in one embodiment to display newly received messages that are very important, such as messages containing updates to meeting requests. In this way, a user can continue to work with electronic messages in a normal fashion, while avoiding the distractions caused by the constant arrival of new messages.

According to one aspect presented herein, data is received defining the duration of a DND time period during which no notification should be provided when an electronic message is received. For instance, a user may specify that no notification should be provided for electronic messages received during a 30-minute period or during the duration of a meeting. If electronic messages are received during the specified DND time period, no notification that a message has been received will be provided. In the case of e-mail messages, for instance, no indication will be provided indicating that an e-mail message has been received in a user's e-mail inbox during the DND time period.

In one embodiment, notification of the receipt of electronic messages is suppressed by hiding electronic messages received during the DND time period. In the case of e-mail messages, for instance, newly received messages to a user's inbox are hidden from view. In another embodiment, notification of receipt of a new electronic message is suppressed by instructing a server computer to not transmit electronic messages during the DND time period.

A user may send electronic messages during the DND time period. A user may also read electronic messages received prior to the beginning of the DND time period. Once the DND time period has elapsed, a notification of receipt for electronic messages received during the DND time period is provided. For instance, electronic messages that were hidden from view during the DND time period may be un-hidden after the DND time period has elapsed, thereby providing a notification to a user that the messages were received during the DND time period.

According to one embodiment, data is received defining one or more types of messages for which a notification of receipt should be provided during the specified DND time period. For instance, a user may specify that high priority messages, messages from a particular sender, or messages containing meeting updates should be permitted during the DND time period. In this embodiment, messages received during the DND time period are examined to determine whether they fall within one of the specified types of electronic messages for which a notification of receipt should be provided. A notification of receipt is provided for any messages received during the DND time period that fall within one of the specified types.

It should be appreciated that although the embodiments described herein are presented in the context of e-mail messages, the embodiments presented herein may be utilized in conjunction with instant messages, SMS messages, and any other type of electronic messages. It should also be appreciated that the above-described subject matter may be implemented as a computer-controlled apparatus, a computer process, a computing system, an article of manufacture such as a computer-readable medium, or in another manner. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
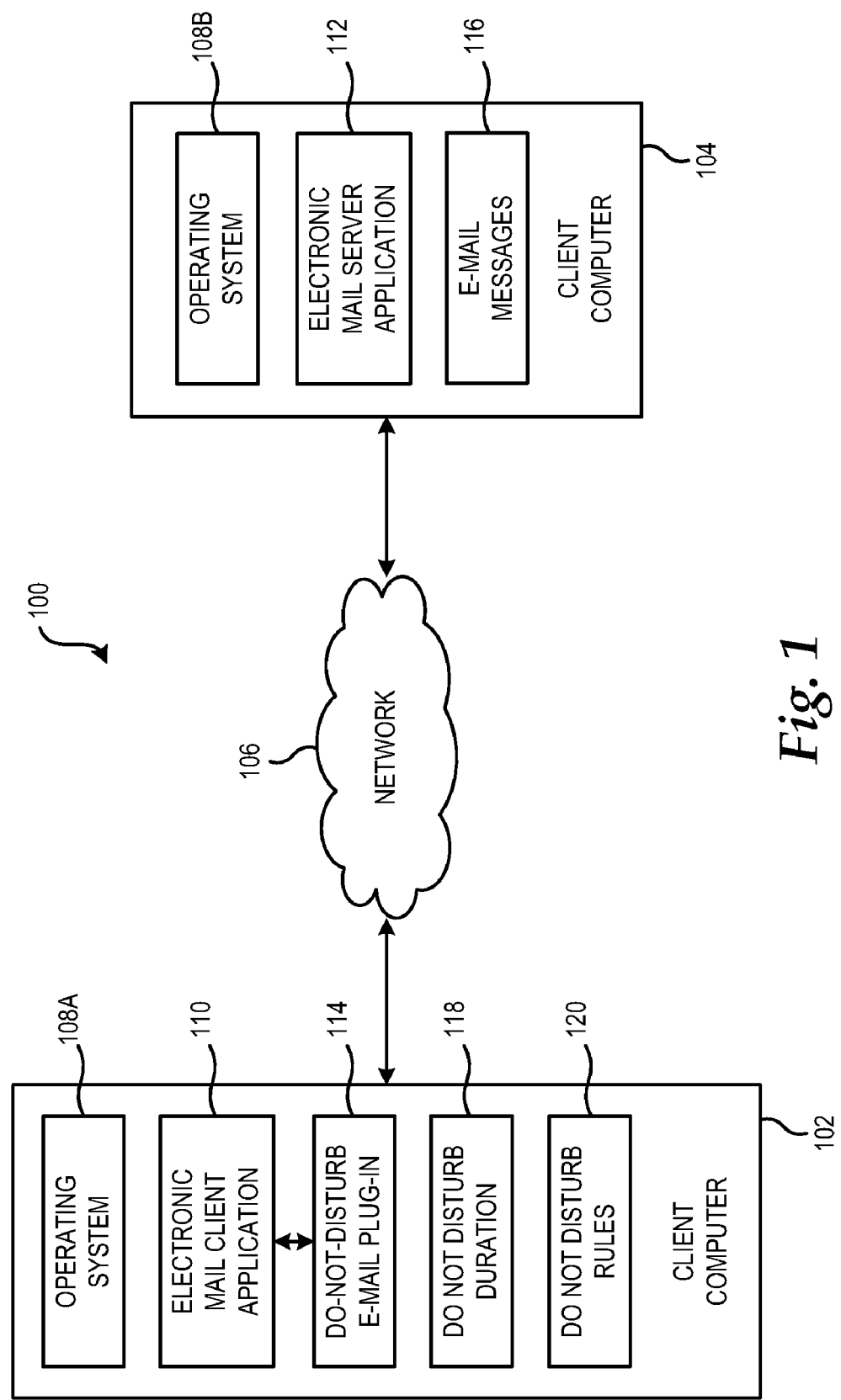
FIG. 1 is a network architecture diagram showing aspects of an illustrative operating environment and several software components provided by the embodiments presented herein.

The following detailed description is directed to technologies for providing a DND filter for electronic messages. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for providing a DND filter for electronic messages will be described.

Referring now to FIG. 1, details regarding one illustrative operating environment for embodiments presented herein will be described. In particular, FIG. 1 shows a system 100 for providing a DND filter for electronic messages. As described briefly above, through the use of the DND filter presented herein, the interruptions caused by the delivery of new electronic messages can be eliminated while still allowing a user to read previously received messages and to compose and send new messages. In order to provide this functionality, the system 100 utilizes a client computer 102 that is connected to a server computer 104 through a network 106. It should be appreciated that while a single client computer 102 is illustrated in FIG. 1, any number of client computers 102 may be utilized in the manner presented herein. Moreover, although a single network 106 is illustrated in FIG. 1, any number of networks may be utilized to establish a communications link between the client computer 102 and the server computer 104. It should be appreciated that the system architecture illustrated in FIG. 1 is simplified, illustrative, and that many other types of architectures may be utilized.

As shown in FIG. 1, the server computer 104 is configured to execute a suitable operating system 108B and an electronic mail server application 112. As known in the art, the electronic mail server application 112 is configured to provide functionality for sending and receiving e-mail messages 116. It should be appreciated that while the embodiments presented herein are described in the context of a DND filter for e-mail messages, the concepts and technologies presented herein may be utilized with virtually any type of electronic message. For instance, in other embodiments the DND filter provided herein may be utilized with instant messages, SMS messages, and other types of electronic messages.

As also illustrated in FIG. 1, the client computer 102 is configured to execute an operating system 108A and an electronic mail client application 110. As known in the art, the electronic mail client application 110 comprises an executable program configured to operate in conjunction with the electronic mail server application 112 executing at the server computer 104. In particular, through functionality provided by the electronic mail client application 110, a user of the client computer 102 can compose electronic mail messages 116 for transmission to a recipient through the electronic mail server application 112. Additionally, the electronic mail client application 110 is configured to communicate with the electronic mail server application 112 to retrieve new e-mail messages for which a user of the client computer 102 is the intended recipient.

According to one implementation, a DND e-mail plug-in 114 is utilized in conjunction with the e-mail client application 110. The DND e-mail plug-in 114 provides the functionality presented herein for providing a DND filter. It should be appreciated that while the embodiments presented herein are described in the context of a plug-in 114 that executes in conjunction with the e-mail client application 110, the concepts and technologies described herein may be implemented directly within the e-mail client application 110. As will also be described in greater detail below with respect to FIG. 4, the functionality provided herein may also be implemented at the server computer 104 in certain embodiments.

As will be described in greater detail below, the DND e-mail plug-in 114 provides functionality for allowing a user of the client computer 102 to specify data 118 defining the duration of a DND time period. The DND time period is a time period during which no notification will be provided by the electronic e-mail client application 110 that an e-mail message has been received from the e-mail server application 112. For instance, during the DND time period, newly received e-mail messages will not be shown in a user's e-mail inbox. Additionally, no other notification will be provided indicating that a new e-mail message has arrived. In embodiments, no GUI windows will be displayed, no sounds will be played, and no other notifications will be provided by the e-mail client application 110 indicating that an e-mail message has been received during the DND time period.

As will also be described in greater detail below, the DND e-mail plug-in 114 allows a user to specify a particular duration for the DND time period. For instance, the DND e-mail plug-in 114 may permit a user to indicate that no notifications should be provided of the receipt of newly arrived e-mail messages for thirty minutes, one hour, two hours, three hours, and so on. The user may also be permitted to input an arbitrary amount of time for the DND.

According to one embodiment, the DND e-mail plug-in 114 also allows a user to specify the duration of the DND time period in terms of the length of a meeting. In this embodiment, the e-mail client application 110 may be configured to maintain a calendar with meeting events. In this way, a user of the client computer 102 can specify that no notification of the receipt of e-mail messages should be provided during the duration of a meeting. In addition to allowing a user to specify in advance a predetermined DND time period, the DND e-mail plug-in 114 may also allow a user to manually start and stop the DND time period.

According to one embodiment, the DND e-mail plug-in 114 also allows a user to provide data 120 defining one or more types of e-mail messages for which notification of receipt should be provided during the DND time period. When messages satisfying these predefined types arrive during the DND time period, the e-mail client application 110 will provide a notification of their receipt. For instance, the e-mail client application 110 may show these messages in a user's e-mail inbox, may display a GUI window or other type of visual notification, or may play a sound.

In one embodiment, the data 120 utilized to specify the types of messages for which notification should be provided during the DND time period may be based upon the sender of the incoming e-mail message. For instance, a user may specify that if an e-mail message is received from their manager, the e-mail message should be delivered during the DND time period. In this regard, the data 120 may utilize an organizational structure to determine whether an incoming e-mail message was transmitted by a supervisor or other person at a higher level in the organization chart.

The data 120 may also consider a calendar maintained by the electronic mail client application 110. In this way, incoming e-mail messages from senders that are also identified in upcoming meetings may be displayed during the DND time period. In other embodiments, the data 120 may include senders that have been recently communicated with, lists of specific people or sender e-mail addresses a user of the client computer 102 has specified, other properties of an e-mail message, the number of recipients an e-mail message is addressed to, whether an e-mail message is flagged for follow-up or flagged as important, and whether specified user-provided words are listed in a subject line of an incoming e-mail message. No notification of receipt will be provided for any e-mail message received during the DND time period that does not meet the criteria defined by the data 120. In one embodiment, the data 120 is completely customizable by a user of the client computer 102 to specify exactly the types of e-mail messages for which a notification of receipt should be provided during the DND time period.

According to another embodiment, a user may specify that the DND filter provided by the DND e-mail plug-in 114 turns on and off depending upon the time of day. For instance, in this embodiment a user may specify that the DND filter would turn on each day from 12:00 pm to 2:00 pm and again from 4:00 pm to 6:00 pm. In effect, this would mean that the user would only receive notification of new e-mail messages during one or more specified time periods each day. In another embodiment, an organization may specify the DND time periods for each of their employees in an attempt to improve the productivity of the employees.

It should be appreciated that, in one embodiment, the e-mail client application 110 suppresses notification of incoming e-mail messages during the DND time period by hiding the newly received messages in a user's e-mail inbox. In this way, the newly arrived e-mail messages are cached at the client computer 102 and can be made available to the user of the client computer 102 when the DND time period expires even if no connection can be established to the server computer 104. The incoming e-mail messages may also be hidden in other e-mail folders in other embodiments.

In another embodiment, the incoming e-mail messages for which no notification should be provided are not delivered to the e-mail client application by the e-mail server application 112. In this embodiment, the e-mail client application 110 may provide an instruction to the e-mail server application 112 indicating the no new e-mail messages should be delivered to the e-mail client application 110 during the DND time period. Alternative implementations may also be apparent to those skilled in the art.

It should be appreciated that in each of the embodiments presented herein, the e-mail client application 110 is configured to allow a user to send e-mail messages through the e-mail server application 112 during the DND time period. Additionally, the e-mail client application 110 is also configured to allow a user to read e-mail messages received prior to the DND time period during the DND time period. In this manner, the e-mail client application 110 provides all of its typical functionality during the DND time period except for providing a notification of the receipt of e-mail messages.

It should also be appreciated that when the DND period has ended, the e-mail client application 110 is also configured to provide a notification of the receipt of any e-mail messages received during the DND time period. For instance, in one embodiment, the e-mail client application 110 is configured to unhide any e-mail messages received during the DND time period that were hidden in order to suppress the notification of receipt. Other types of notifications may also be provided by the e-mail client application 110 indicating that messages were received during DND time period. In an embodiment wherein the e-mail server application 112 does not send e-mail messages to the e-mail client application 110 during the DND time period, an instruction may be provided to the e-mail server application 112 at the end of the DND time period indicating that the delivery of e-mail messages to the e-mail client application 110 should resume.

Figure 2A:
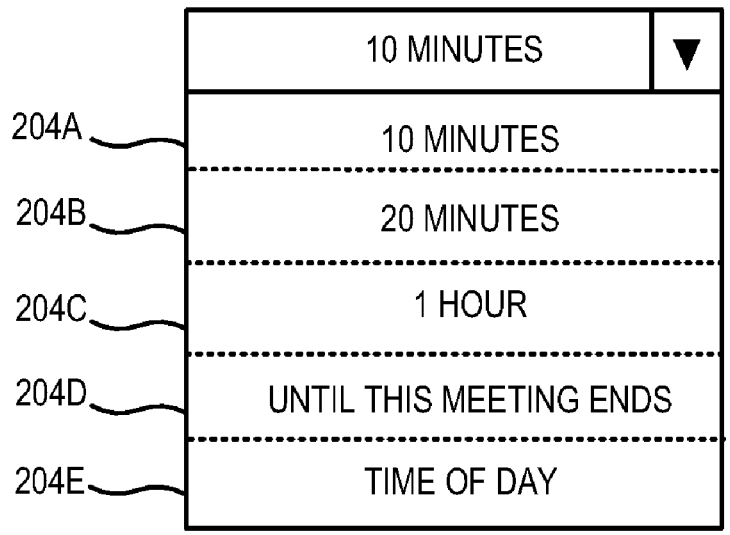
FIGS. 2A-2C are user interface diagrams showing aspects of several user interfaces provided in embodiments presented herein.

Referring now to FIG. 2A, one illustrative user interface 200A provided by the DND e-mail plug-in will be described for allowing a user of the client computer 102 to specify the data 118 defining the duration of the DND time period. In one embodiment, the user interface 200A includes a number of selectable user interface items 204A-204E through which a user of the client computer 102 can specify the duration of the DND time period. For instance, the user interface item 204A corresponds to a ten minute DND time period, the user interface item 204B corresponds to a twenty minute DND time period, and the user interface item 204C corresponds to a one hour DND time period. It should be appreciated that other predefined periods of time may be specified through the user interface 200A.

As discussed briefly above, in one embodiment the DND e-mail plug-in 114 allows a user of the client computer 102 to specify the duration of the DND time period in terms of the duration of a meeting. In this embodiment, a selectable user interface item 204D is provided in the user interface 200A for allowing a user to specify the duration of the DND time period in this manner. It should be appreciated that the selectable user interface items 204A-204E may be selected in a conventional manner through the use of a mouse or keyboard user input device. It should also be appreciated that the user interface shown in FIG. 2A is merely illustrative and that other types of user interfaces may be provided for allowing a user of the client computer 102 to specify the duration of the DND time period.

As also briefly described above, in one embodiment a user may specify one or more time periods during each day during which the DND filter will be automatically turned on and off. The selectable user interface item 204E allows a user to select this method of specifying the duration of the DND time period. It should be appreciated that an appropriate user interface for allowing the user to specify the times at which the DND filter should be automatically turned on and off may also be provided in embodiments.

Figure 2B:
Figure 2C:
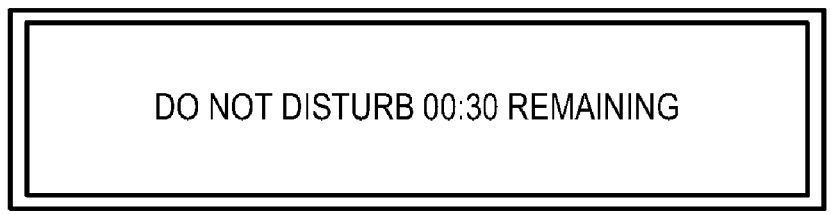

Referring now to FIGS. 2B and 2C, additional details will be provided regarding the user interfaces provided by the DND e-mail plug-in 114 in one embodiment. In particular, FIG. 2B illustrates a user interface control 200B displayed by the DND e-mail plug-in 114 that allows a user of the client computer 102 to turn on the DND filter provided by the DND e-mail plug-in 114. Through the selection of the user interface control 200B, a user of the client computer 102 can instruct the DND e-mail plug-in 114 to begin suppressing the notification of newly received e-mail messages.

FIG. 2C shows an illustrative user interface 200C provided by the DND e-mail plug-in 114 while the DND filter is active. In this case, the user interface 200C provides an indication of the amount of time remaining during the DND time period. When selected, the user interface 200C will cause the DND filter provided by the DND e-mail plug-in 114 to be deactivated regardless of the amount of time remaining during the DND time period. It should be appreciated that the user interface controls 200B and 200C may be selected by a user of the client computer 102 to manually start and stop the DND filter provided by the DND e-mail plug-in 114. It should also be appreciated that the user interface controls illustrated in FIGS. 2B and 2C are illustrative and that other types of user interfaces may be provided in other embodiments.

Figure 3:
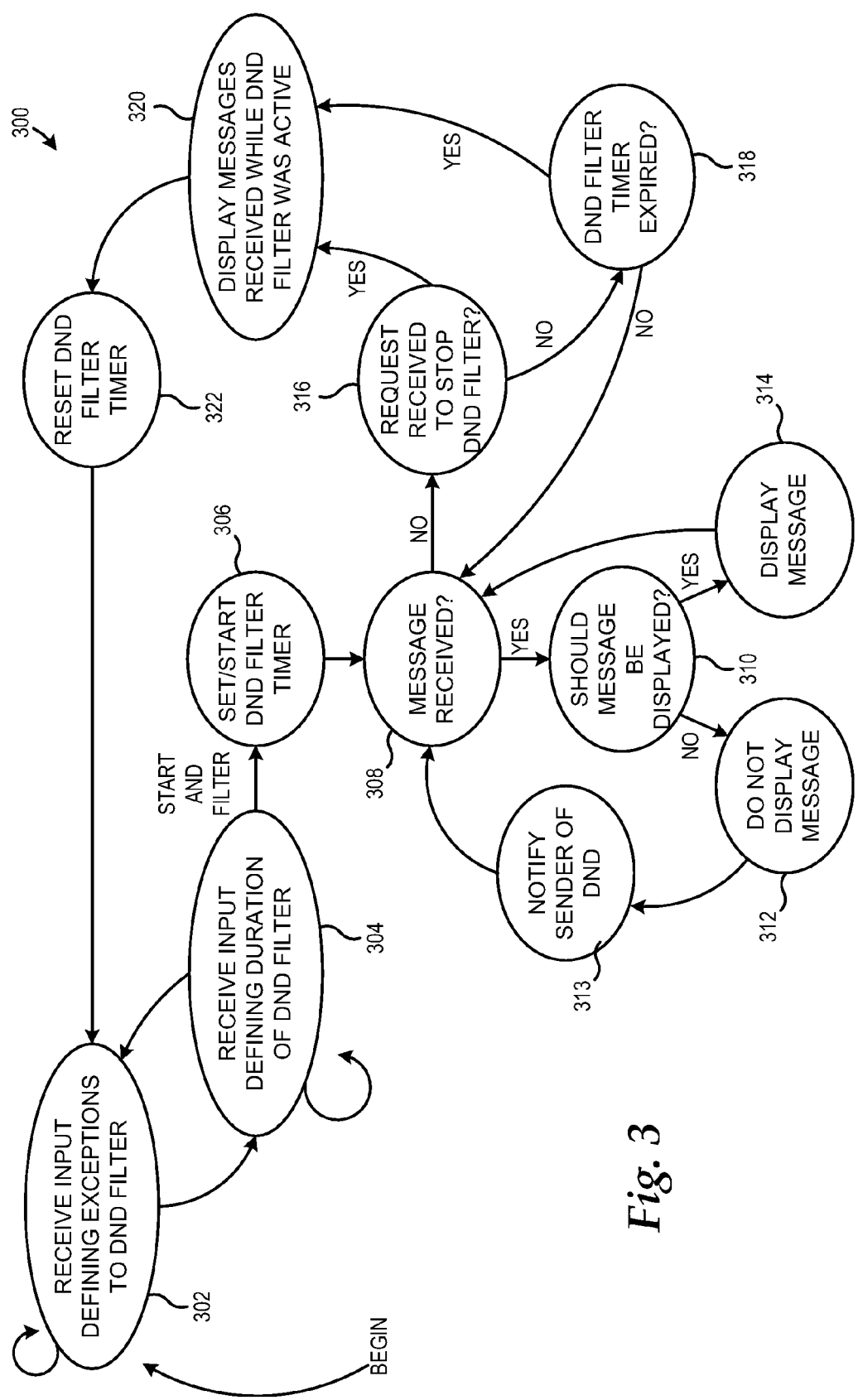
FIG. 3 is a state diagram showing one illustrative process performed in one embodiment presented herein for providing a DND filter for electronic messages.

Referring now to FIG. 3, additional details will be provided regarding the embodiments presented herein for providing a DND filter for electronic messages. In particular, FIG. 3 is a state diagram showing a state machine 300 that illustrates aspects of the operation of the DND e-mail plug-in according to one embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The state machine 300 begins operation at state 302, where the DND e-mail plug-in 114 receives the data 120 that defines the exceptions to the DND filter provided by the DND e-mail plug-in 114. An appropriate user interface may be provided by the DND e-mail plug-in 114 for permitting a user of the client computer 102 to specify the data 120. From state 302, the state machine 300 proceeds to state 304, where input is received defining the data 118 that specifies the duration of the DND time period.

When a user of the client computer 102 requests that the DND filter provided by the DND e-mail plug-in 114 be activated, such as through a selection of the user interface control 200B, the state machine 300 proceeds to the state 306. At the state 306, the DND e-mail plug-in 114 sets and starts a timer corresponding to the DND time period in response to the request that the DND filter be activated.

Once the timer has been started, the state machine 300 proceeds to state 308, where the DND e-mail plug-in 114 determines whether an e-mail message 116 has been received from the e-mail server application 112. If an e-mail message has been received, the state machine 300 proceeds to state 310.

At state 310, the DND e-mail plug-in 114 determines, based on the data 120, whether the received e-mail message corresponds to one of the types of e-mail messages defined by the data 120 for which notification should be provided even while the DND filter is active. If the new e-mail message does not fall into one of the types of messages for which a notification should be provided while the DND filter is active, the state machine 300 proceeds to state 312, where no notification of the newly received e-mail message is provided. As discussed above, notification of the receipt of a new e-mail message may be suppressed by hiding the newly received e-mail message in a user's e-mail inbox in one embodiment.

From state 312, the state machine 300 proceeds to state 313, where a message may be transmitted to the sender of the newly received e-mail message indicating that notification of the receipt of the new message has not been provided to the intended recipient as a result of the DND filter being active. The message to the sender may also indicate that a notification of receipt of the new e-mail message will be provided to the intended recipient when the DND filter is deactivated.

From state 313, the state machine 300 returns to the state 308, described above. If, at state 310, the DND e-mail plug-in 114 determines that a newly received e-mail message should be displayed, the state machine 300 proceeds from state 310 to state 314. At state 314, a notification is provided indicating that the newly arrived e-mail message has been received. For instance, the e-mail client application 110 may display the newly arrived e-mail message in a user's e-mail inbox or provide another type of visual or audible notification. From state 314, the state machine 300 returns to the state 308, described above.

If, at state 308, the DND e-mail plug-in 114 determines that no new message has been received, the state machine 300 proceeds from state 308 to state 316. At state 316, the DND e-mail plug-in 114 determines whether a request has been received from a user of the client computer 102 to stop the operation of the DND filter. For instance, such a request may be received through the selection of the user interface control 200C described above with reference to FIG. 2C. If such a request is received, the state machine 300 proceeds from state 316 to state 320, where a notification of receipt is provided for any e-mail messages received while the DND filter was active. For instance, in one embodiment the DND e-mail plug-in 114 un-hides any e-mail messages received during the DND time period that were hidden in order to suppress notification of their receipt. From operation 320, the state machine 300 proceeds to the state 322, where the timer set at the state 306 is reset. The state machine 300 then proceeds from state 322 to the state 302, described above.

If, at the state 316, the DND e-mail plug-in 114 determines that no request has been received to stop the operation of the DND filter, the state machine 300 proceeds from state 316 to state 318. At state 318, the DND e-mail plug-in 114 determines if the timer set at state 306 has expired. If the timer has not expired, the state machine 300 proceeds from state 318 to state 308, described above. If the timer has expired, the state machine 300 proceeds from operation 318 to operation 320, where a notification of receipt is provided for any e-mail messages received during the DND time period and for which a notification was not previously provided. It should be appreciated that the state machine 300 illustrated in FIG. 3 represents but one implementation of the DND e-mail plug-in 114 and that other implementations may be utilized to provide the functionality described herein.

Figure 4:
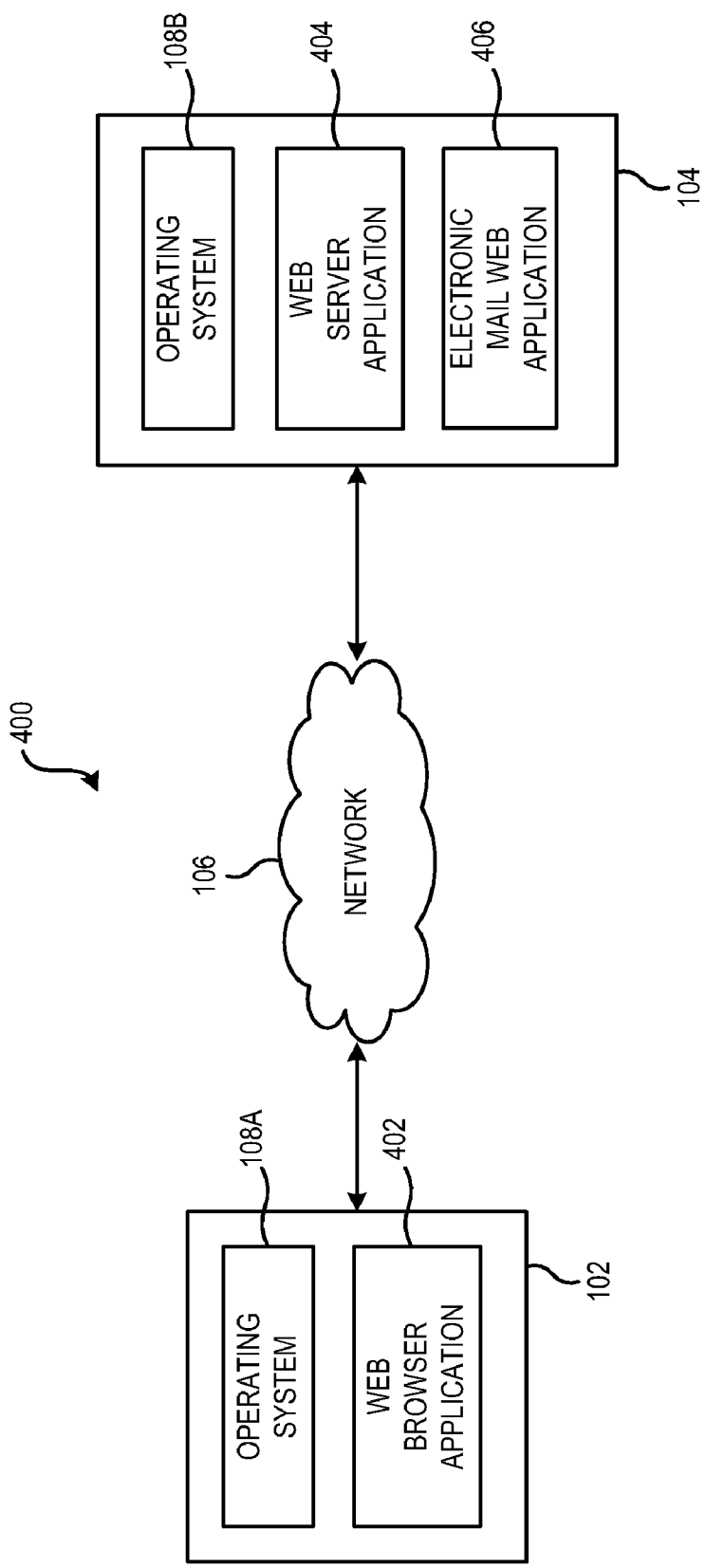
FIG. 4 is a network architecture diagram showing aspects of another illustrative operating environment for embodiments presented herein.

Referring now to FIG. 4, another illustrative operating environment for one embodiment will be described. In particular, FIG. 4 shows a network architecture 400 for implementing the DND filter described above at the server computer 104. In this embodiment, the server computer 104 is configured to execute a World Wide Web ("Web") server application 404 and an e-mail Web application 406. As known in the art, the e-mail Web application 406 provides a Web-based user interface for sending and receiving e-mail messages. In this embodiment, a user of the client computer 102 can utilize a Web browser application 402 to interact with the e-mail Web application 406 to send, receive, and manage e-mail messages.

In the embodiment illustrated in FIG. 4, the functionality described above for providing the DND filter is integrated with the e-mail Web application 406. In this manner, a user of the Web browser application 402 can interact with the e-mail Web application 406 to define the DND time period and to define the types of e-mail messages for which notification of receipt should be provided during the DND time period. The user of the client computer 102 may also specify through the e-mail Web application 406 that the DND filter should be started and stopped.

While the DND filter provided by the e-mail Web application 406 is active, no notification of newly arrived e-mail messages will be provided through the Web interface provided by the e-mail Web application 406. If a user has defined data 120 specifying certain types of emails for which a notification should be provided during the DND time period, a notification of receipt of e-mail messages satisfying the defined types may be provided. In this manner, the DND filter described above, may be provided with respect to a Web-based e-mail system in a similar manner as provided for use with a client application 110 and described above with reference to FIGS. 1-3.

Figure 5:
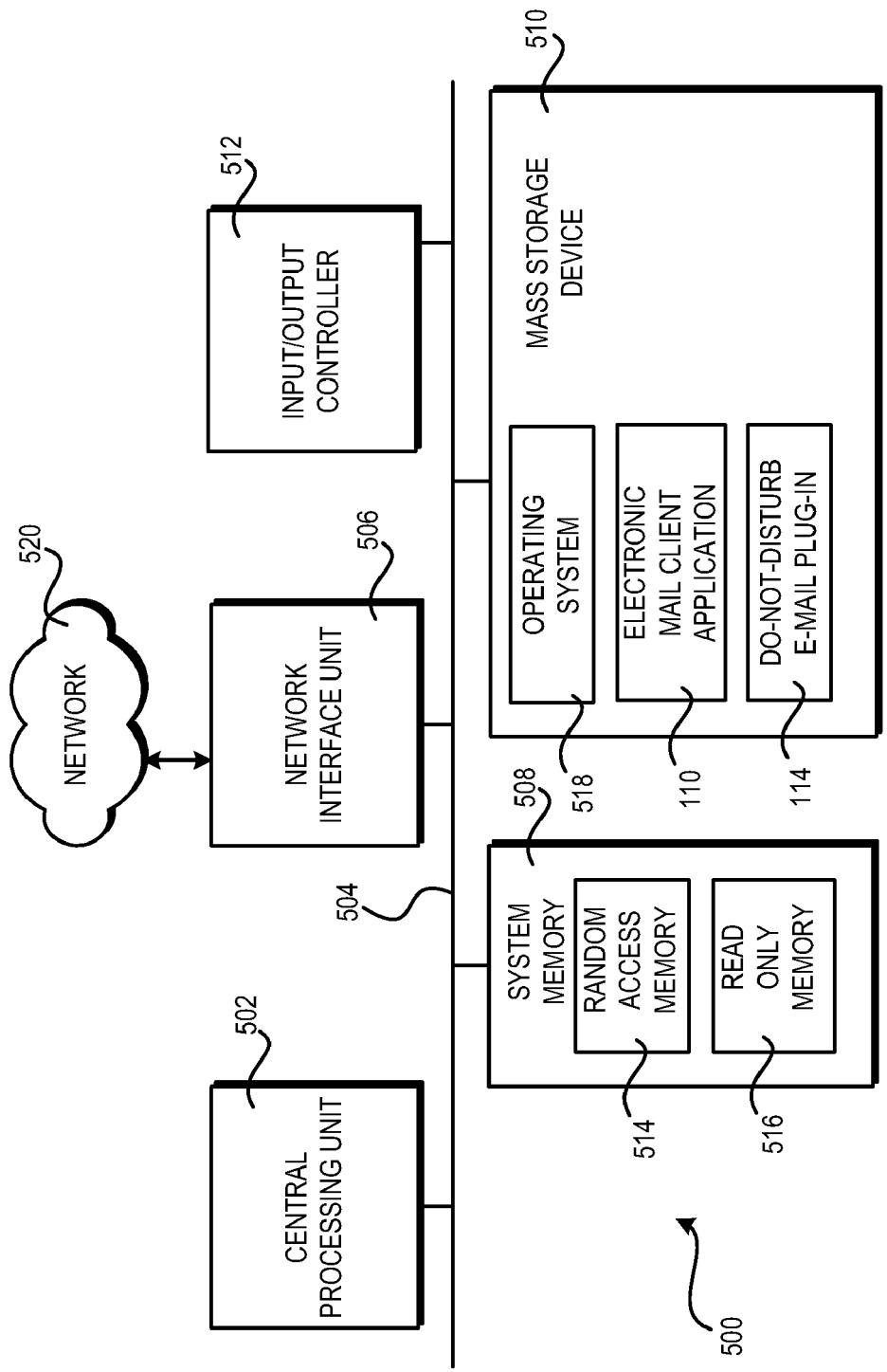
FIG. 5 is a computer architecture diagram showing an illustrative computer hardware and software architecture for a computing system capable of implementing aspects of the embodiments presented herein.

FIG. 5 shows an illustrative computer architecture for a computer 500 capable of executing the software components described herein for providing a DND filter for electronic messages in the manner presented above. The computer architecture shown in FIG. 5 illustrates a conventional desktop, laptop, or server computer and may be utilized to execute any aspects of the software components presented herein described as executing on the client computer 102 or the server computer 104.

The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules. In particular, the mass storage device 510 and the RAM 514 may store the e-mail client application 110 and the DND e-mail plug-in 114, each of which was described in detail above with respect to FIGS. 1-4. The mass storage device 510 and the RAM 514 may also store other types of program modules and data.

Based on the foregoing, it should be appreciated that technologies for an electronic message DND filter are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for suppressing a notification of the receipt of one or more electronic messages, the method comprising:

providing a user interface through which a user can specify a time period during which notification of the receipt of an electronic message should be suppressed;

receiving data by way of the user interface defining the duration of a time period during which notification of the receipt of an electronic message should be suppressed;

receiving a request from the user to suppress notification of the receipt of electronic messages during the time period;

in response to the request, suppressing notification that an electronic message has been received during the duration of the time period;

receiving data from the user defining one or more types of electronic message or which a notification of receipt should be provided during the time period;

in response to receiving an electronic message during the time period, determining whether the received electronic message is in one of the types of electronic messages for which a notification of receipts should be provided during the time period; and providing a notification of the receipt of the received electronic message in response to determining that the received message is in one of the types of electronic messages for which a notification of receipt should be provided during the time period.

2. The method of claim 1, further comprising:
determining that the time period has expired; and
in response to determining that the time period has expired, providing a notification of the receipt of any messages received during the time period.

3. The method of claim 2, further comprising permitting electronic messages to be sent during the time period.

4. The method of claim 3, further comprising permitting electronic messages received prior to the time period to be read during the time period.

5. The method of claim 4, further comprising not providing a notification of the receipt of the received electronic message in response to determining that the received message is not in one of the types of electronic messages for which a notification of receipt should be provided during the time period.

6. The method of claim 5, wherein suppressing notification that an electronic message has been received during the time period comprises hiding all electronic messages received during the time period.

7. The method of claim 6, wherein providing a notification of the receipt of any messages received during the time period comprises un-hiding all electronic messages received during the time period.

8. The method of claim 6, wherein the user interface comprises a selectable user interface item through which the user can specify that the time period comprises the duration of a meeting.

9. The method of claim 8, wherein the electronic messages comprise electronic mail (e-mail) messages.

10. A computer storage medium that is not a signal having computer executable instructions stored thereon which, when executed by a computer, cause the computer to:
provide a user interface through which a user can specify a period of time during which notification of the receipt of electronic messages should be suppressed;
receive a request from the user to suppress notification of the receipt of electronic messages for a period of time specified through the user interface;
suppress notification of the receipt of any electronic messages during the period of time;
permit the sending of electronic messages during the period of time;
permit the reading of electronic messages during the period of time that were received prior to the period of time;
receive data from a user defining one or more types of electronic messages for which notification of receipt should be provided during the period of time; and to
provide notification of receipt of electronic messages in the specified types during the period of time.

11. The computer storage medium of claim 10, having further computer executable instructions stored thereon which, when executed by the computer, cause the computer to suppress notification of receipt of electronic messages of types other than the specified types during the period of time.

12. The computer storage medium of claim 11, having further computer executable instructions stored thereon which, when executed by the computer, cause the computer to:

determine that the period of time has elapsed; and
in response to determining that the period of time has elapsed, to provide notification of receipt for any electronic messages received during the period of time.

13. The computer storage medium of claim 12, wherein suppressing notification of the receipt of any electronic messages during the period of time comprises hiding any electronic message received during the period of time.

14. The computer storage medium of claim 12, wherein suppressing notification of the receipt of any electronic messages during the period of time comprises instructing a server computer to not transmit any electronic messages during the period of time.

15. The computer storage medium of claim 13, wherein providing notification of receipt for any electronic message received during the period of time comprises un-hiding any electronic messages received during the period of time.

16. The computer storage medium of claim 14, wherein providing notification of receipt for any electronic message received during the period of time comprises instructing the server computer to transmit any electronic messages received during the period of time.

17. The computer storage medium of claim 13, wherein the electronic messages comprise electronic mail (e-mail) messages.

18. The computer storage medium of claim 13, wherein the electronic messages comprise instant messages.

19. The computer storage medium of claim 13, wherein the electronic messages comprise short message service (SMS) messages.

20. A method for suppressing a notification of the receipt of one or more electronic mail (e-mail) messages, the method comprising:
providing a user interface through which a user can specify a time period during which no notification of the receipt of e-mail messages should be provided;
receiving data through the user interface defining the duration of a time period during which no notification should be provided when an e-mail message is received;
receiving data defining one or more types of e-mail messages for which notification should be provided during the time period;
receiving a request to provide only notification of the receipt of e-mail messages in the types during the time period;
receiving an e-mail message during the time period;
in response to receiving the e-mail message, determining whether the received e-mail message is in one of the types of e-mail messages for which notification should be provided during the time period;
displaying a notification for the received e-mail message if the received e-mail message is in one of the types of e-mail messages for which notification should be provided during the time period;
hiding the received e-mail message if the received e-mail message is not in one of the types of e-mail messages for which notification should be provided during the time period;
determining whether the period of time has elapsed; and
in response to determining that the period of time has elapsed, un-hiding any e-mail messages that were received and hidden during the time period.

* * * * *